US005141428A

United States Patent [19]

Boukal et al.

[11] Patent Number: 5,141,428

[45] Date of Patent: Aug. 25, 1992

[54] APPARATUS FOR CUTTING THIN-WALLED TUBES

[75] Inventors: Josef A. Boukal, Quinton; Mike Braunshteyn; Jack C. Wheless, both of Richmond; Kathleen S. Whittle, Chester, all of Va.

[73] Assignee: Philip Morris Incorporated, New York, N.Y.

[21] Appl. No.: 494,598

[22] Filed: Mar. 16, 1990

[51] Int. Cl.[5] .................... B29C 57/00

[52] U.S. Cl. .................... 425/289; 425/297; 425/301; 425/306

[58] Field of Search .................... 131/280; 425/289, 296, 425/297, 301, 306

[56] References Cited

U.S. PATENT DOCUMENTS

| | | | |
|---|---|---|---|
| 1,018,473 | 2/1912 | Auchu | 493/290 |
| 1,117,527 | 11/1914 | Simon | 131/66.2 |
| 2,898,817 | 8/1959 | Lutz et al. | 493/156 |
| 3,060,814 | 10/1962 | Wagner et al. | 493/41 |
| 3,119,397 | 1/1964 | Molins et al. | 131/94 |
| 3,382,874 | 5/1968 | Pinkham | 131/280 |
| 3,466,213 | 9/1969 | Larson et al. | 156/245 |
| 3,822,621 | 7/1974 | Knights et al. | 83/23 |
| 4,063,480 | 12/1977 | Hinzmann | 83/176 |
| 4,174,476 | 11/1979 | Boling et al. | 219/121.67 |
| 4,369,796 | 1/1983 | Hall | 131/95 |
| 4,893,673 | 1/1990 | Hancock et al. | 165/167 |

FOREIGN PATENT DOCUMENTS

| | | | |
|---|---|---|---|
| 1203157 | 4/1986 | Canada . | |
| 0115360 | 8/1984 | European Pat. Off. . | |
| 2030580 | 12/1971 | Fed. Rep. of Germany . | |
| 2734643 | 4/1978 | Fed. Rep. of Germany . | |
| 1588980 | 5/1981 | United Kingdom . | |
| 2096448 | 10/1982 | United Kingdom | 131/280 |

*Primary Examiner*—Tim Heitbrink

*Attorney, Agent, or Firm*—Jeffrey H. Ingerman; John W. Matthews

[57] ABSTRACT

An apparatus for precision cutting lightweight, thin-walled tubes that includes transfer drums for transporting rough cut, thin-walled tubes from a source of supply past a first inspection station to determine if the tubes are crushed beyond a predetermined amount, a flaring station to flare the tube ends, an aligning station to align the tubes from cutting, and a cutting station to cut the tube into multiple sections. Section drums are provided that have second and third inspection stations to determine if the tubes have been properly cut.

28 Claims, 8 Drawing Sheets

106
(A)
106
180
(B)
206
204
202
200
130
180
(C)
218
216
214
212
210
208
(D)
216
214
212
210
208
218
(E)

APPARATUS FOR CUTTING THIN-WALLED TUBES

FIELD OF THE INVENTION

The present invention relates to apparatuses for precision cutting thin-walled tubes into multiple sections.

BACKGROUND OF THE INVENTION

The advent of non-combustion smoking articles has brought about construction considerations that were not faced in the manufacture of conventional smoking articles. Such non-combustion smoking articles have the basic appearance of conventional cigarettes; however, beyond the similarity, they are very different.

Non-combustion smoking articles may consist of a short combustible fuel element and a flavor bed. The fuel element may be mounted in one end of a reflective inner sleeve in such a manner that it extends from that end of the sleeve. The flavor bed is contained within the inner sleeve and held in place by structures disposed across the inside diameter of the inner sleeve.

The inner sleeve, which has the fuel element extending from one end and the flavor bed contained within it, is enclosed by an air permeable outer sleeve. An end cap is fixed at the lighting end of the smoking article. The outer sleeve may consist of a single laminate structure, or a separate outside and inside structure.

The single laminate structure has a metal foil layer and a porous paper layer. When the outer sleeve is formed, the porous paper is disposed at the outside diameter and the metal foil at the inside diameter. The aluminum foil disposed at the inside diameter is used to reflect the heat radiated by a fuel element toward the interior of the smoking article.

When the outer sleeve consists of two separate structures, the outside structure is a porous plug wrap tube and the inside structure is a laminate metal foil structure that acts as a reflective heat shield.

The outer sleeve, with the combination within it that includes the fuel element, flavor bed, and inner sleeve, has a thin-walled tube fitted to its nonlighting end. This tube, which functions as an expansion chamber, serves as the mouthend of the smoking article. The distal end of this tube may be fitted with a filter.

One of the problems that has been faced in the construction of lightweight paper or laminate tubes is precision cutting these tubes. Co-pending application Ser. No. 07/494,761, which is commonly assigned, is directed to an apparatus that forms lightweight, thin-walled tubes. However, in constructing non-combustion smoking articles there is also a need to cut the tubes within fine tolerances so that the non-combustion smoking article may be mechanically assembled with precision assembly machinery. If the tubes are not precision cut to a predetermined length, it may result in machinery jamming or at best low output of completed smoking articles.

The present invention overcomes these problems and provides an apparatus for precision cutting lightweight, thin-walled tubes that are suitable for use in the manufacture of non-combustion smoking articles.

SUMMARY OF THE INVENTION

The present invention is an apparatus that is used for precision cutting lightweight, thin-walled tubes that are used in the manufacture of smoking articles.

In accordance with the present invention, rough cut, thin-walled tubes having a large length tolerance are fed into a feed hopper. The tubes may be paper tubes, paper/paper laminate tubes, paper/metal foil laminate tubes, or metal foil/metal foil laminate tubes.

A first transfer drum receives the rough cut tubes from the hopper and transports them to a second transfer drum. While attached to the second transfer drum, the tubes move past a first inspection station which senses if the tubes are crushed beyond a predetermined point. If any are, they are ejected.

The second transfer drum then transfers the tubes that pass inspection to a third transfer drum. In transporting the tubes on the third drum, both ends are flared.

The flared tubes are transferred to a fourth transfer drum. The fourth drum has means associated with it to align the tubes in preparation for precision cutting.

After the tubes are aligned they are transferred to a fifth drum, the cutter drum. The fifth drum has cutting blades associated with it that are used to precision cut the tubes. As the aligned tubes are transported toward the cutting blades, a separate mandrel is moved into and through each tube. This operation lifts the tubes from their respective drum flutes. Once the mandrel is through a tube, the distal end of the mandrel engages a drive mechanism that rotates the mandrel and, therefore, the tube that is riding on it. The speed that the mandrel rotates the tube matches the speed that the fifth drum moves the tubes beneath five stationary cutting blades. As the tubes move beneath the blades, each tube is pinch cut by each blade. The cutting blades are either in line or staggered to prevent deformation of the tube during cutting.

After a tube has been precision cut into multiple sections, these sections are transported to a sixth transfer drum and then to a seventh transfer drum. The first and third tube sections are transferred to an eighth transfer drum and the second and fourth tube sections are transferred to a ninth transfer drum.

While the first and third tube sections are on the eighth drum, they are moved past a second inspection station to ensure that there is not a tube section between them. If there is, it indicates the tube is not properly cut and the connected sections are discarded. The eighth transfer drum transports the first and third tube sections that passed inspection to a hopper for use in the manufacture of smoking articles.

Similarly, the second and fourth tube sections while on the ninth transfer drum move past the third inspection station which determines if there is a tube section between them. Again, the presence of a tube section indicates that the tube was not properly cut and the connected tube sections are discarded. The tube sections that pass the inspection are then transported to a hopper for use in the manufacture of smoking articles.

An object of the present invention is to provide an apparatus for precision cutting lightweight, thin-walled tubes.

Another object of the invention is to provide an apparatus for precision cutting lightweight, thin-walled tubes that inspects the tubes before cutting to ensure that such tubes are not crushed beyond a predetermined amount.

A further object of the invention is to provide an apparatus for cutting lightweight, thin-walled tubes that flares the ends of the tubes prior to cutting to accommodate disposition of a mandrel through the tube.

A yet further object of the invention is to provide an apparatus for cutting thin-walled tubes that upon nearing the cutting blades lifts each tube from its drum flute with a mandrel and rotates the tube on the mandrel at a speed that matches the speed that the drum moves the tube beneath the stationary cutting blades to pinch cut the tube into multiple sections.

Another object of the invention is to provide an apparatus for cutting thin-walled tubes that will not distort lightweight, thin-walled tubes when cutting them.

A still further object of the invention is to provide an apparatus for cutting lightweight, thin-walled tubes that inspects the multiple tube sections after cutting to ensure that proper cutting has been accomplished.

These and other objects of the invention will be described more fully in the remainder of the specification.

DETAILED DESCRIPTION OF THE DRAWINGS

Figure 1:
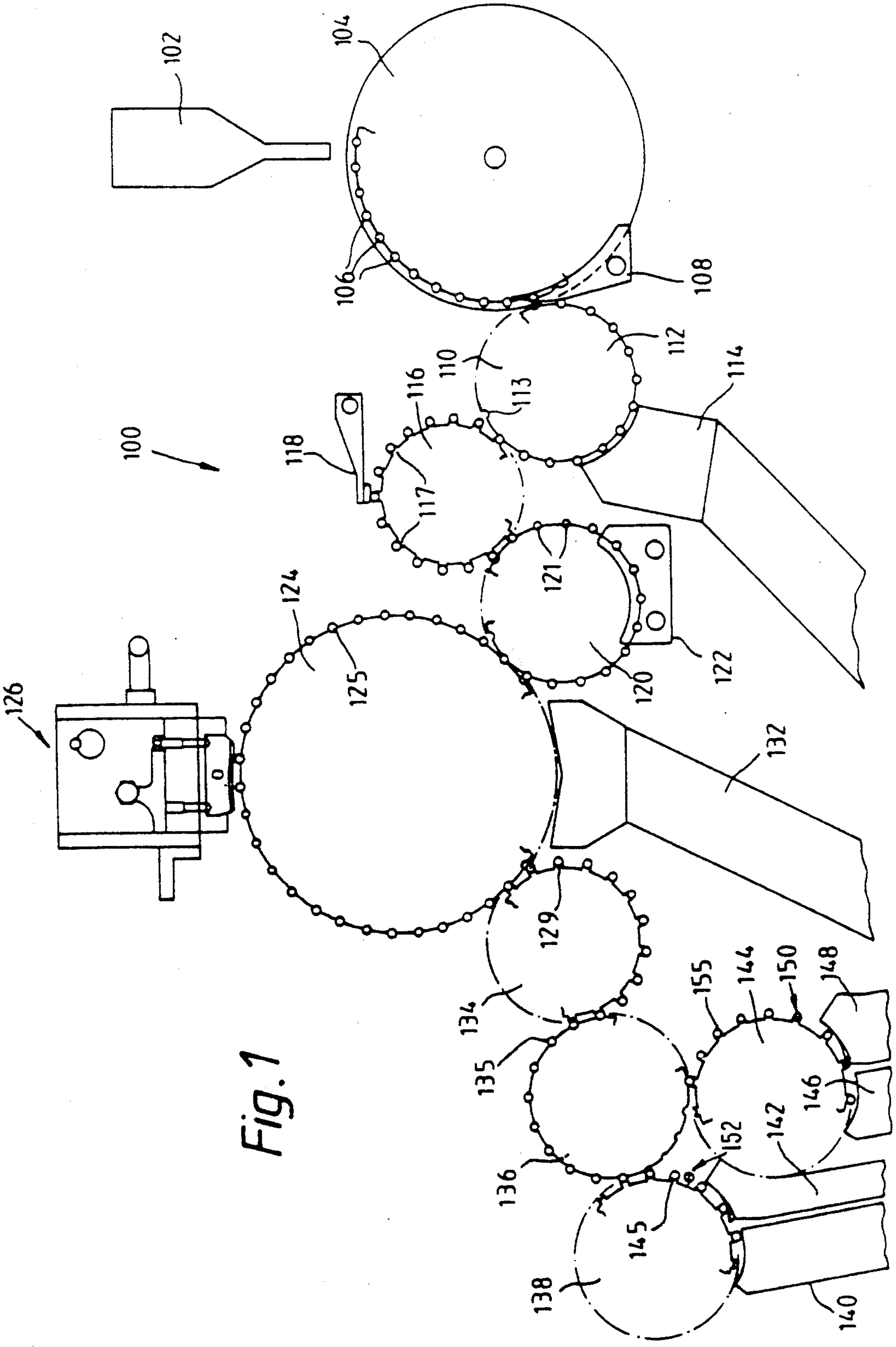
FIG. 1 is a front perspective view of the apparatus of the present invention.

The present invention is an apparatus for cutting thin-walled tubes. FIG. 1 shows a front perspective view of the apparatus of the present invention generally at 100. This apparatus may be used for cutting various types of thin-walled tubes including paper tubes, paper/paper laminate tubes, paper/metal foil laminate tubes, or metal foil/metal foil laminate tubes.

The apparatus shown in FIG. 1 includes a series of rotating drums that work cooperatively to convey the rough cut, thin-walled tubes through a series of stations which result in a plurality of precision cut tubes for use as part of non-combustion smoking articles.

All of the drums that will be described, viz., drums 104, 110, 116, 120, 124, 134, 136, 138, and 144, have flutes disposed transversely across their periphery that are parallel to the rotational axis of the drum. Vacuum suction is applied to the flutes through a prescribed arc and venting through the flutes through another prescribed arc. These arcs will be described for each drum.

Hopper 102 is continuously loaded with the rough cut, thin-walled tubes that are approximately 100 mm in length. The rough cut tubes are gravity fed to the flutes 106 of hopper drum 104. Hopper drum 104 turns in the counter-clockwise direction.

In the counter-clockwise direction, hopper drum 104 has a 195° vacuum suction section for flutes 106 from the 090° position to the 255° position; an 8° section which has neither vacuum suction nor vent air from the 255° position to the 247° position; a 132° vent air section from the 247° position to the 115° position; and a 25° section which has neither vacuum suction nor vent air from the 115° position to the 090° position.

As hopper drum 104 rotates in the counter-clockwise direction, at approximately the 000° position, the rough cut tubes are fed from hopper 102 to flutes 106. Since vacuum suction is applied to the flutes at this drum position, the tubes are held in the respective flutes. The rough cut tubes are held in the flutes until the flute reaches the 255° position, at which point, an 8° section is entered that has neither vacuum suction nor vent air. At this drum position, hopper drum 104 is adjacent first transfer drum 110 and the rough cut tubes are transferred from the hopper drum to the first transfer drum.

The rough cut tubes that for some reason are not transferred to first transfer drum 110 by the time a particular flute of the hopper drum reaches the 247° position are subjected to vent air through the holes in flutes 106 to remove the stuck tubes. If the vent air does not remove a tube from a flute, product stripper 108 will remove it. The product stripper is conventional and known by those skilled in the art.

First transfer drum 110 rotates clockwise. In the clockwise direction, first transfer drum 110 has a 240° vacuum suction section for flutes 113 from the 075° position to the 315° position; a 10° section which has neither vacuum suction nor vent air from the 315° position to the 325° position; a 10° vent air section from the 325° position to the 335° position; and a 100° section which has neither vacuum suction nor vent air from the 335° position to the 075° position.

The rough cut tubes that are transported by the first transfer drum 110 are moved past first inspection station 112 which determines whether or not each tube is crushed beyond 40%. The inspection station is located at the 145° position. The inspection station is preferably a conventional light beam-type inspection device such as model Banner which is commercially available from SM53E and SM53R.

The rough cut tubes that are determined to be crushed more than 40% are ejected from the first transfer drum in a 40° section from the 205° position to the 245° position. The tubes are ejected by means ejection air provided through the flutes. The ejected tubes are deposited into scrap chute 114.

At the point of vacuum suction cut-off, at the 315° position, first transfer drum 110 is adjacent flare drum 116. The rough cut tubes are transferred to flare drum 116 at the 10° section from the 315° position to the 325° section where there is neither vacuum suction nor vent air supplied to flutes 113.

In the following 10°, from the 325° position to the 335° position, vent air is supplied to flutes 113. This air will relieve vacuum from flutes 113 to enable product to transfer from drum 110 to drum 116.

Flare drum 116 rotates counter-clockwise. In the counter-clockwise direction, flare drum 116 has a 270° vacuum suction section for flutes 117 from the 135° position to the 225° position; a 10° section which has neither vacuum suction nor vent air from the 225° position to the 215° position; a 10° vent air section from the 215° position to the 205° position; and a 70° section which has neither vacuum suction nor vent air from the 205° position to the 135° position.

Flutes 117 are raised members that extend radially outward from the periphery of flare drum 116. These raised flutes receive the rough cut tubes at the 135° position and transport them in a counter-clockwise direction past flaring station 118. At flaring station 118, a projectile-shaped member is inserted in each open end of the rough cut tubes to flare them. The ends are flared to facilitate the disposition of a mandrel therethrough. The swash roller station is conventional such as model 41-0-1FA commercially available from Hauni under model number 41-0-1FA.

Vacuum suction is cut-off at the 225° position which is where alignment drum 120 is adjacent flare drum 116. The rough cut tubes are transferred to alignment drum 120 during the next 10° from the 225° position to the 215° position. In this 10° section, neither vacuum suction or vent air is supplied to raised flutes 117.

In the next 10°, from the 215° position to the 205° position, vent air is supplied to raised flutes 117. The vent air will relieve vacuum from flutes 117 to enable product to transfer from drum 116 to drum 120.

Alignment drum 120 rotates clockwise. In the clockwise direction, alignment drum 120 has a 270° vacuum suction section for flutes 121 from the 045° position to the 315° position; a 10° section which has neither vacuum suction nor vent air from the 315° position to the 325° position; a 10° vent air section from the 325° position to the 335° position; and a 70° section which has neither vacuum suction nor vent air from the 335° position to the 045° position.

The rough cut tubes are transported in the clockwise direction from the 045° position to the 315° position in flutes 121. In the transportation of the tubes at the periphery of the alignment drum, they are moved through alignment station 122. At this station, the tubes are aligned so that they will be in the proper position for cutting operations that will take place during the transport of tubes by the cutting drum. The alignment station is conventional and known by those of ordinary skill in the art.

Vacuum suction that is applied through holes in flutes 121 is cut-off at the 315° position which is where alignment drum 120 is adjacent cutter drum 124. The rough cut, thin-walled tubes are transferred to cutter drum 120 during the next 10° which is from the 315° position to the 325° position. In this 10° section, neither vacuum suction nor vent air is supplied to flutes 121.

In the next 10° that follow (from the 325° position to the 335° position), vent air is supplied to flutes 121. The air will relieve vacuum from flutes 121 to enable product to transfer from drum 120 to 124.

Figure 2:
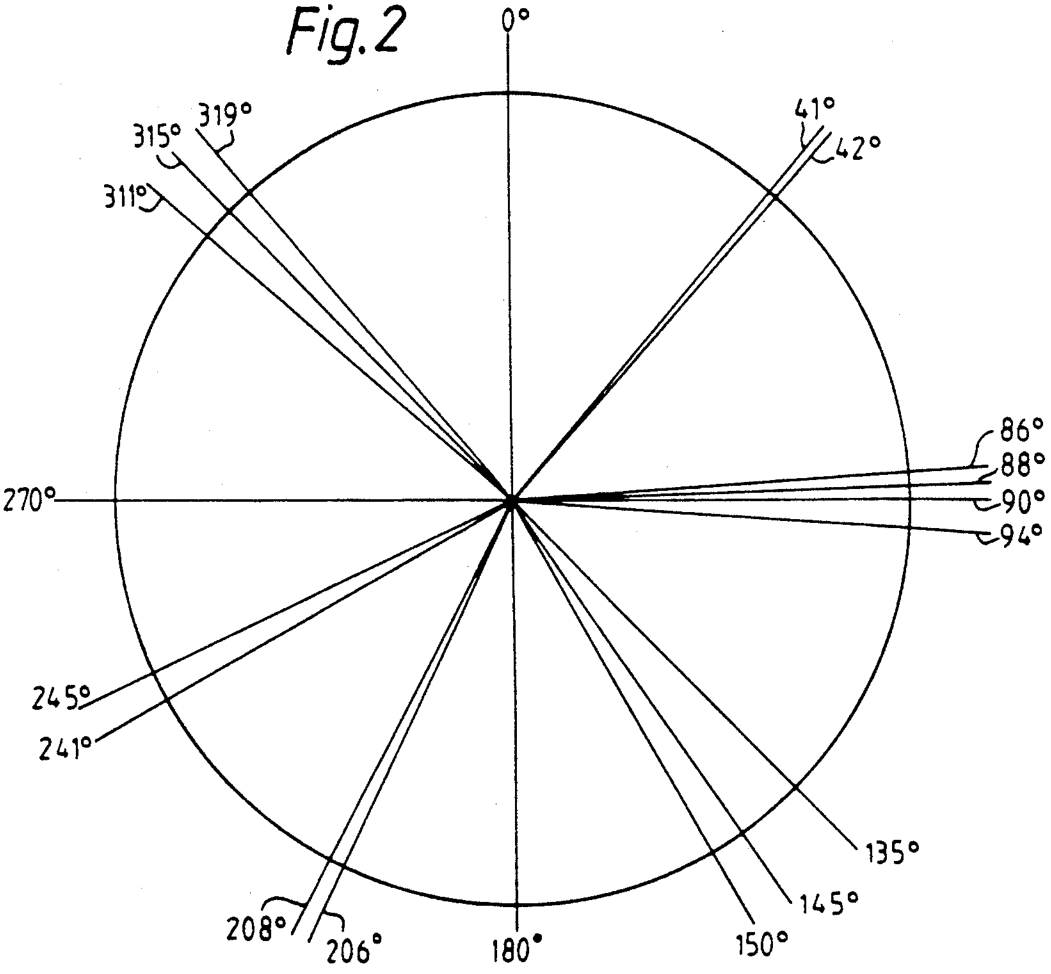
FIG. 2 is a diagram of the vacuum suction and vent air sections for the flutes of the cutter drum, and the control air for pneumatically driving the plunger carrying the mandrel.
Figure 5:
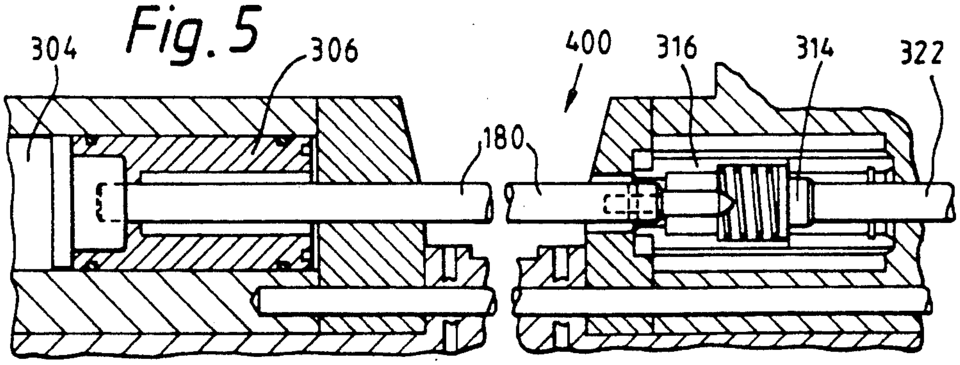
FIG. 5 is a sectional view of the mandrel mated with the female drive assembly.
Figure 3:
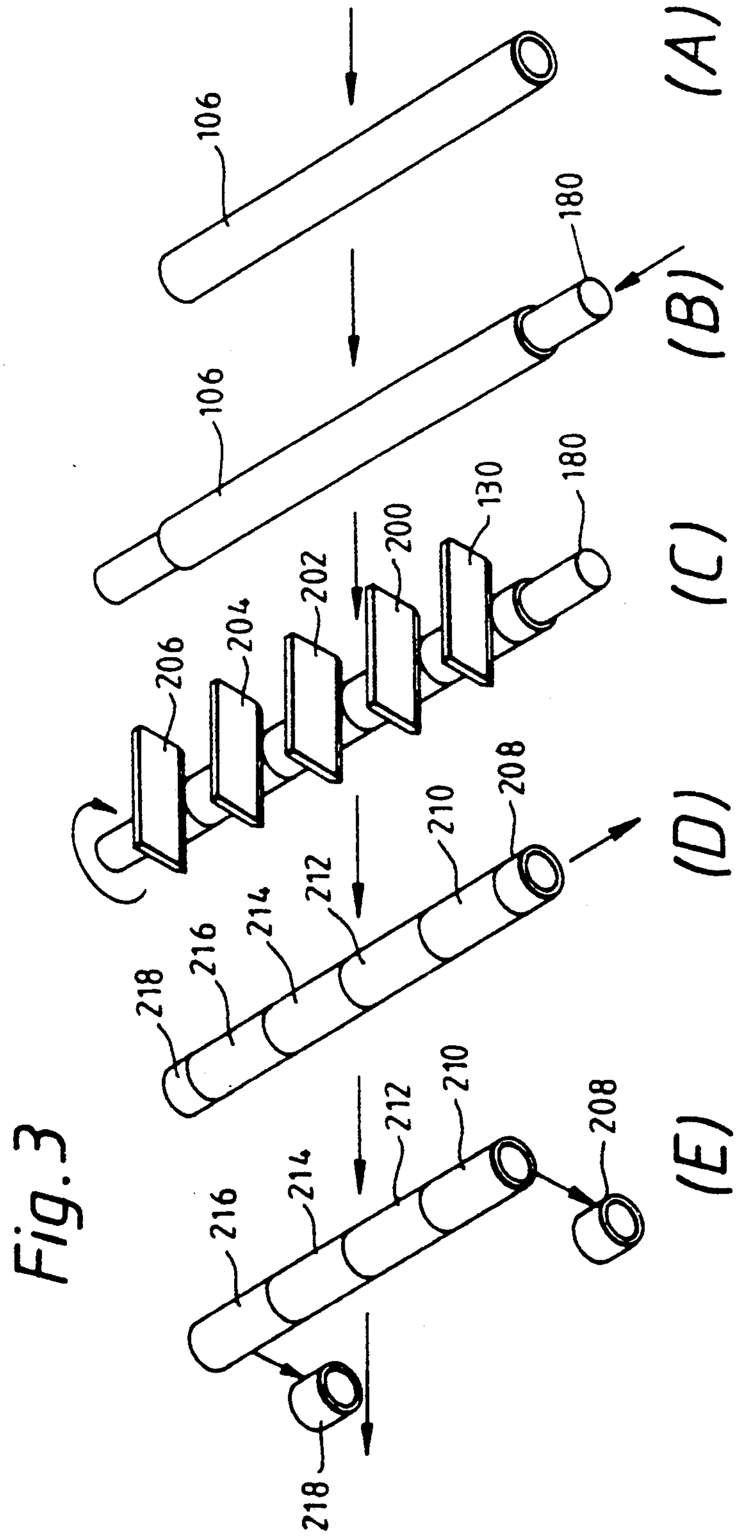
FIG. 3 is a simplified diagram of the cutting operation of the apparatus of the present invention.
Figure 4:
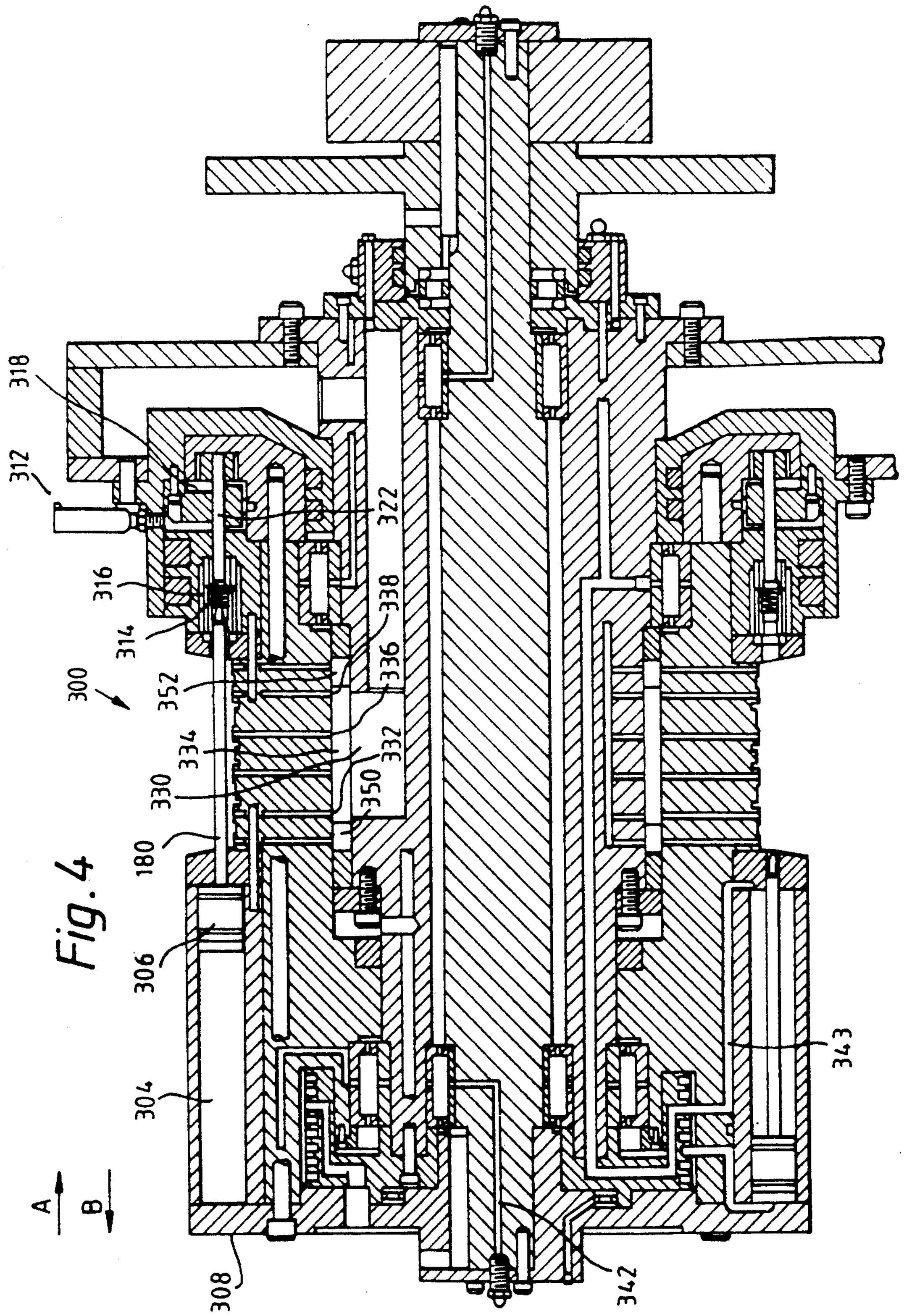
FIG. 4 is a cross-sectional view of the cutter drum of the apparatus of the present invention at the cutting site.
Figure 10:
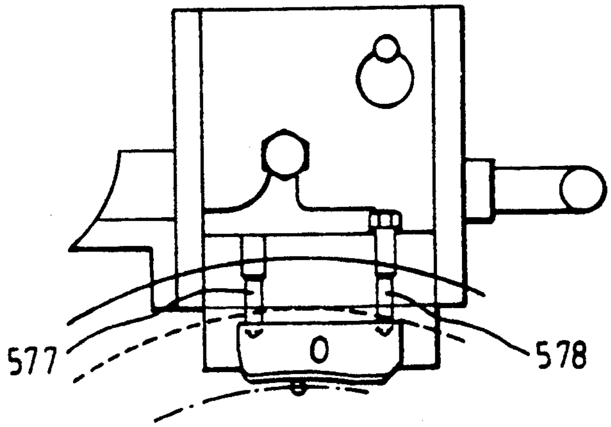
FIG. 10 is a front view of a cutting assembly.
Figure 11:
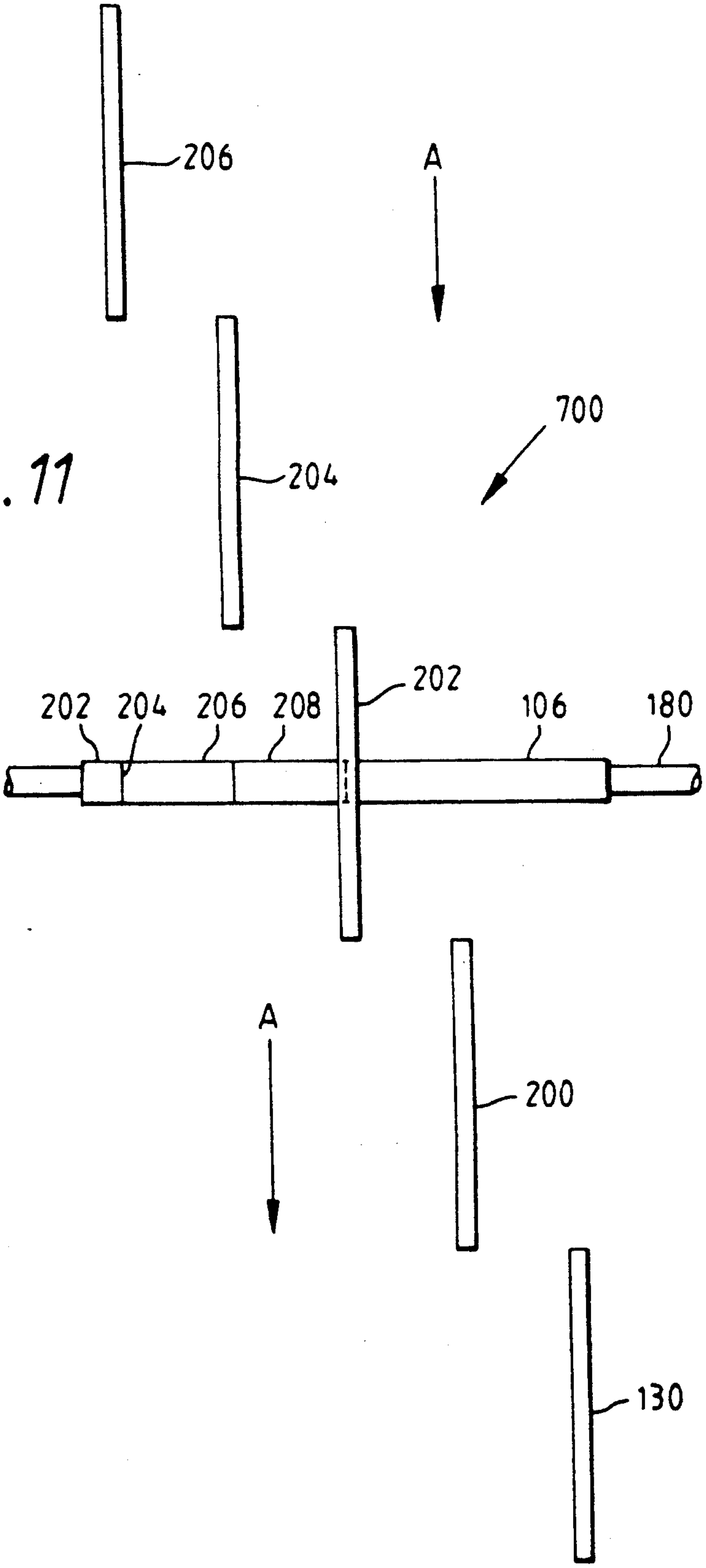
FIG. 11 shows an alternative embodiment for disposition of the cutting blades.

Cutter drum 124 With flutes 125 is shown with adjacently disposed cutting assembly 126. FIGS. 2-11 also will be referred to in describing the cutter drum and the cutting assembly. FIG. 2 is a diagram of the vacuum suction and vent air sections for the flutes of the cutter drum, and the control air for pneumatically driving the plunger carrying the mandrel. FIG. 3 shows the cutting operation. FIG. 4 shows a cross-sectional view of the cutter drum, the mandrel/ plunger assembly and the female drive assembly. FIGS. 5, 6A-B, and 7A-B show the plunger/mandrel assembly in detail, and the end of the mandrel and the female drive that receives the mandrel. FIGS. 8A-B show views of the cutting assembly. FIGS. 9A-E show different knife profiles for disposition in the cutting assembly. FIG. 10 shows a front view of a cutting assembly. FIG. 11 shows the preferred disposition of the cutting blades.

Cutter drum 124 rotates counter-clockwise. Referring to FIG. 2, in the counter-clockwise direction, cutter drum 124 has a 55° vacuum suction section for flutes 125 from the 145° position to the 090° position; a 2° section which has neither vacuum suction nor vent air from the 090° position to the 088° position; a 46° vent air section from the 088° position to the 042° position; an 87° section which has neither vacuum suction nor vent air from the 042° position to the 315° position; a 70° vacuum suction section from the 315° position to the 245° position; a 2° section which has neither vacuum suction nor vent air from the 245° position to the 243° position; a 35° vent air section from the 243° position to the 208° position; a 2° section which has neither vacuum suction nor vent air from the 208° position to the 206° position; a 56° eject air section from the 206° position to the 150° position; and a 5° section which has neither vacuum suction nor vent air from the 150° position to the 145° position.

In conjunction with the vacuum suction, vent air, and eject air that are provided to flutes 125, air is provided for the pneumatic operation of the mandrel/plunger assembly. As rough cut, thin-walled tubes are transported past the 094° position, air vented from the plunger associated with a particular flute is stopped and channelled to the plunger to drive the connected mandrel through the thin-walled tube in the flute. At the 090° position, the mandrel engages the thin-walled tube. At the 086° position, after the mandrel has been driven through the rough cut tube, air is again vented from the plunger. Air is vented from the plunger while the tube is transported through the 127° section from the 086° position to the 319° section.

At the 319° position, air is channelled to the plunger to drive it in an opposite direction to remove (disengage) the mandrel from within the precision cut tube. The plunger will have moved a sufficient amount to disengage the mandrel at the 315° position.

At the 311° position, the air to the plunger is again vented. It is vented for a 217° section from the 311° position to the 041° position at the start of another mandrel/plunger assembly cycle.

Referring to FIG. 3, a simplified diagram of the cutting operation will be described. At position (A), rough cut tube 106 is being transported by cutter drum 124. At position (B), the tube is engaged by mandrel 180. When the mandrel engages the tube, the tube is lifted from the flute a predetermined distance.

The mandrel has a diameter that is smaller than the thin-walled tube, therefore, the mandrel is easily driven through the tube. This action also is facilitated by the flared ends of the tube.

Once the mandrel is in place, its distal end is received by a female drive assembly. When the female drive assembly is activated the mandrel and the tubes riding on it are rotated. The tube will achieve the same rotational speed of the mandrel after a brief period of time. The speed that the tube rotates matches the speed that the cutter drum passes the tube under the cutting blades. Therefore, the tube will be pinch cut as shown at position (C). As rotating rough cut tube 106 passes under blades 130, 200, 202, 204, and 206, each blade pinch cuts the tube.

As shown at position (D), the blades pinch cut rough cut tube 106 into four equal length tubes 210, 212, 214, and 216. These tubes are approximately 20 mm.

Ends 208 and 218 of the tube are cut from the equal length center sections. And at position (E), ends 208 and 218 are discarded and the four equal length tube sections 210, 212, 214, and 216 are moved on to other stations.

FIG. 4 shows generally at 300 a crosssectional view of cutter drum 124, the mandrel/plunger assembly, and the female drive assembly. The cutter drum is driven in a conventional manner.

Mandrel 180 is seated in plunger 306. Plunger 306 is contained within pneumatic cylinder 304. As shown in FIG. 3, plunger 306 and mandrel 180 have been driven in direction "A" in the pneumatic cylinder so that the mandrel engages the female drive assembly.

Initially, the plunger and mandrel are driven in direction "B" so that the end of the plunger contacts the end of pneumatic cylinder 304 that is formed by end plate 308. When it is desired to drive mandrel 180 in direction "A" to engage rough cut tube 106, air is supplied to pneumatic cylinder 304 through passageway 342. Conversely, when it is desired to drive mandrel 180 in direction "B" to disengage the mandrel from the rough cut tube, air is supplied to the pneumatic cylinder through passageway 343.

Vacuum suction and vent air are provided to flutes 125 via chamber 330 and passageways 332, 334, 336, and 338. Eject air for removal of ends 208 and 218 (FIG. 3) is supplied via passageways 352 and 350, respectively.

Female drive assembly 312 receives the end of mandrel 180 in a mating relationship. In particular, the end of the mandrel is received by the female member 316. Spring 314 absorbs the shock when the mandrel is driven into the female drive assembly. Once the end of the mandrel is properly seated in the female member, drive shaft 322 is driven via gear 318 to rotate the mandrel at a predetermined speed.

Figure 6A:
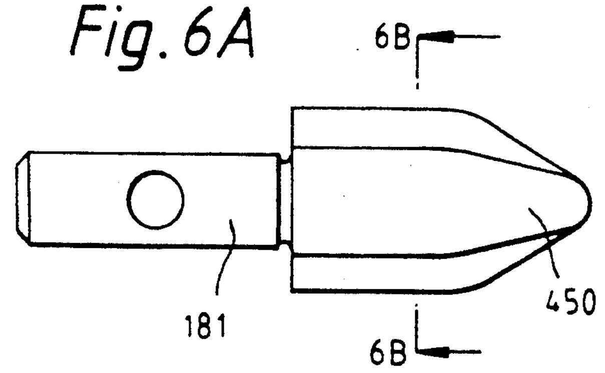
FIGS. 6A-6B are representative views of the splined end of the mandrel that is received by the female driving assembly.
Figure 6B:
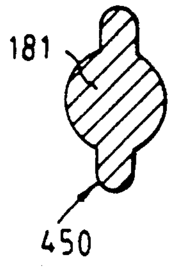

FIGS. 6A-B show views of the end piece that is fitted to the end of a representative mandrel. End piece 181 has a plurality of members 450 that extend radially outward from the mandrel.

Figure 7A:
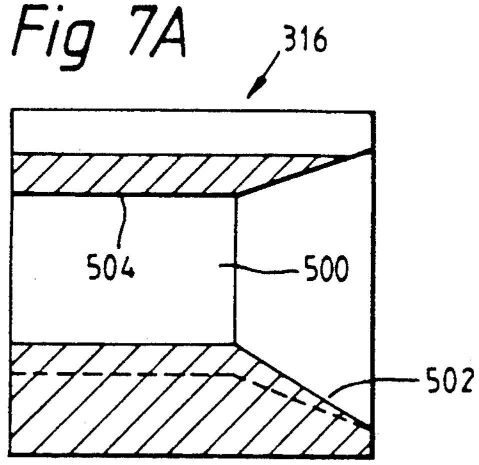
FIGS. 7A-7B are representative views of the female drive assembly that receives the splined end of the mandrel.
Figure 7B:
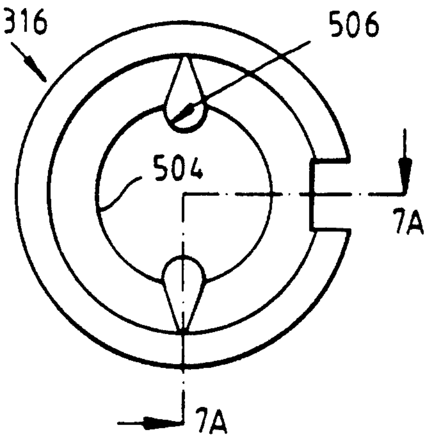
Figure 8A:
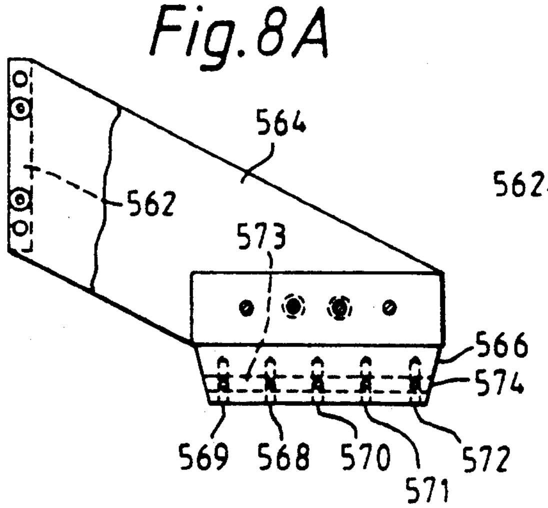
FIG. 8A is a side view of the cutting blade assembly for the table unit.
Figure 8B:
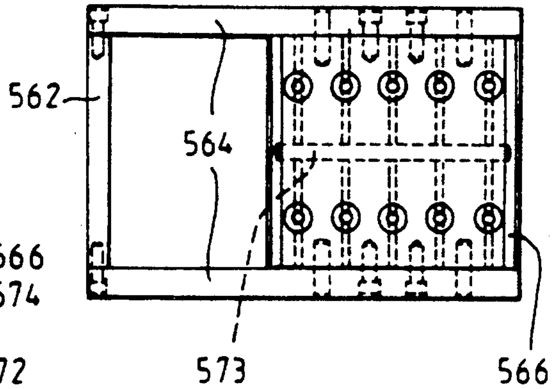
FIG. 8B is a top view of a cutting blade assembly of FIG. 8A for the table unit.

FIGS. 7A-B show views of a representative female member of the female drive assembly. Female member 316 has a sloped entrance 502 to facilitate reception of the piece 181 attached to the end of mandrel 180 and central opening 500 which has inside diameter 504 that is slightly larger than the outside diameter of mandrel 180. The inside diameter has relief areas 506 which conform to the shape of raised members 450 that extend from the outside diameter of the mandrel.

FIGS. 8A-B shows views of cutting assembly 126. Rectangular blade 562 connects to the main portion of the apparatus of the invention. Angle side plates 564 are attached to the sides of plate 562. Side plate 564 angles down from plate 562 at an acute angle. Attached between side plate 562 near the distal end is cutter plate head 566. Cutter plate head 566 has a rectangular top portion and a beveled bottom portion. The bottom beveled portion, has grooves 568, 569, 570, 571 and 572 disposed accrossed perpendicular to side plates 564. The width of the grooves is slightly larger than the width of each of the five cutting blades which fit within each of the respective cutting blades. The bottom portion has a bore 573 through it that is disposed perpendicular to the side plates 564. The bore passes through each of the knife grooves. This bore is for disposition of a pin 574 holds each of the respective cutting knifes within the bottom section of the cutter blade head 566.

Figure 9A:
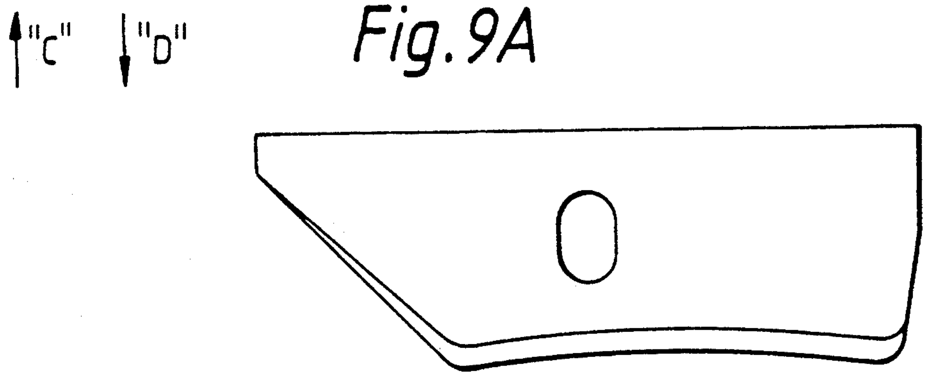
FIGS. 9A-E show different knife profiles for disposition in the cutting assembly.
Figure 9B:
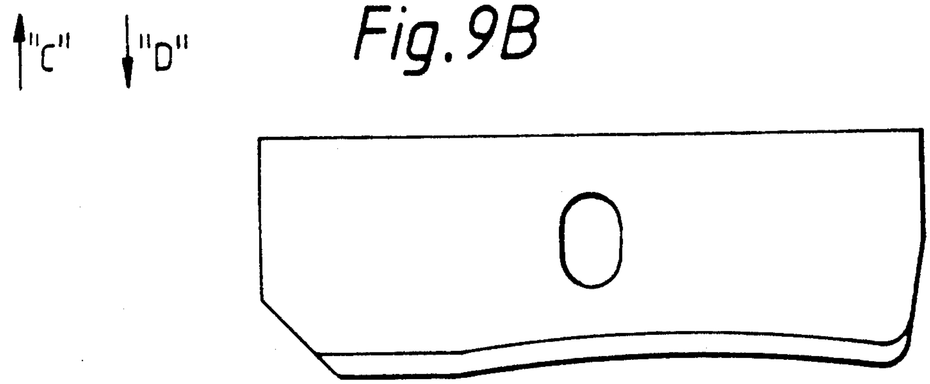
Figure 9C:
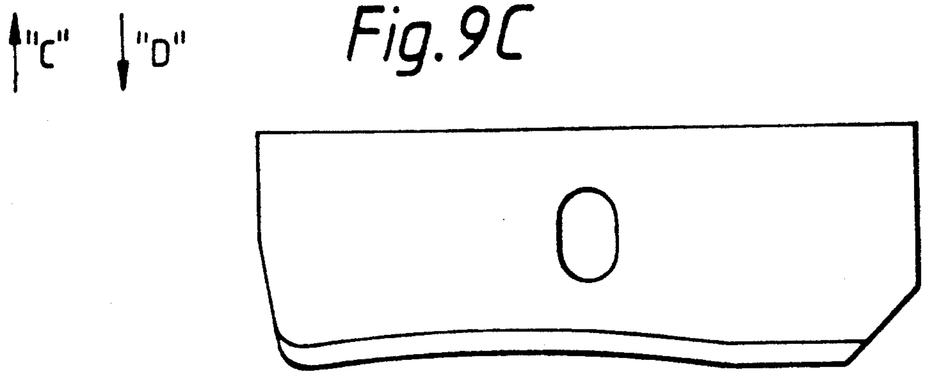
Figure 9D:
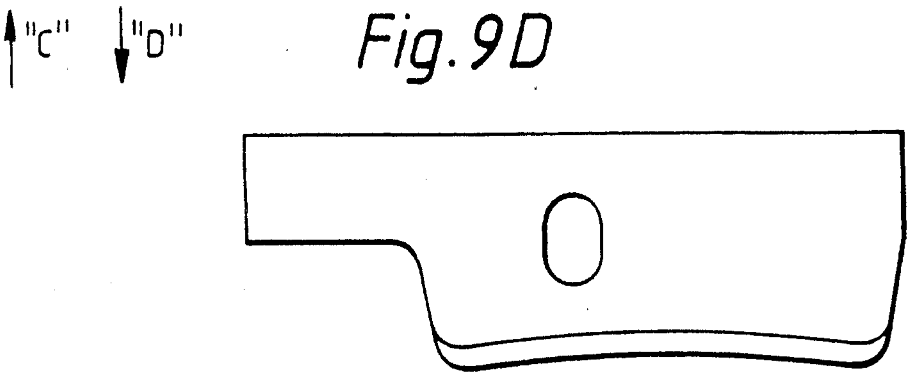
Figure 9E:
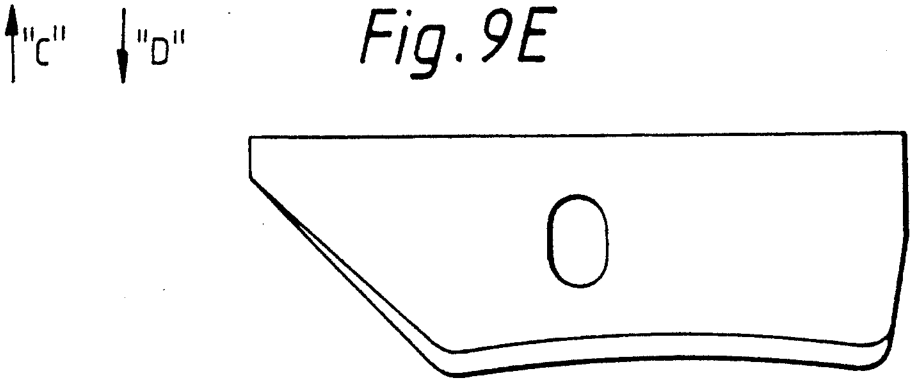

FIGS. 9A, B, C, D, and E show different knife profiles for disposition in the cutting head assembly shown in FIGS. 8A and B. Each of the cutting knives includes centrally disposed oblong hole 900 in the respective plates that allows the plates to move slightly in directions "C" and "D" in response to disposition of the tubes being cut and the mandrel upon which they are disposed passing under the knife plates.

FIG. 10 shows a front view of the cutter head assembly 128 with one cutting knife shown pinch cutting a tube on a mandrel. It is noted that springs 577 and 578 bias the cutting blade in direction "D" for cutting the tubes on the mandrel. However, because of the oblong hole centrally located in the cutting knives, the blade will rock within its respective groove for pinch cutting the tubes on the mandrel.

FIG. 11 shows an alternative and preferred disposition of the blades to prevent formation of bumps 602 and 604. In this embodiment, the blades are staggered so that blades successively cut the tube, thus, the bumps are not formed.

Referring again to the operation of cutter drum 124, at the point of vacuum suction cut-off, at the 245° position, cutter drum 124 is adjacent transfer drum 134. The tube sections are transferred to transfer drum 134 during the next 2° when there is neither vacuum suction nor vent air supplied to flutes 125.

In the following 35°, from the 243° position to the 208° position, vent air is supplied to flutes 125. This air will blow any remaining tubes from flutes 125 to enable them to receive another tube in the next rotation. Remaining tubes will be ejected into scrap chute 132.

Transfer drum 134 rotates clockwise. In the clockwise direction, transfer drum 134 has a 210° vacuum suction section for flutes 129 from the 45° position to the 255° position; a 10° section which has neither vacuum suction nor vent air from the 255° position to the 265° position; a 10° vent air section from the 265° position to the 275° position and a 130° section which has neither vacuum suction nor vent air from the 275° position to the 45° position.

At the point of vacuum suction cut-off, at the 255° position, transfer drum 134 is adjacent transfer drum 136. Transfer is effected to transfer drum 136 during the next 10° when there is neither vacuum suction nor vent air supplied to flutes 129.

In the following 10°, from the 265° position to the 275° position, vent air is supplied to flutes 129. This air will relieve vacuum from flute 129 to enable product to transfer from drum 124 to drum 134.

Transfer drum 136 rotates counter-clockwise. In the counter-clockwise direction, transfer drum 136 has a 255° vacuum suction section on alternating tube sections 216 and 212 (as shown in FIG. 3) for flutes 135 from the 75° position to the 180° position; a 10° section which has neither vacuum suction nor vent air from the 180° position to the 170° position; a 25° vent air section from the 170° position to the 145° position and a 70° section which has neither vacuum suction nor vent air from the 145° position to the 75° position. Transfer drum 136 also has a 170° vacuum suction section on alternating tube sections 214 and 210 (see FIG. 3) of flutes 135 from the 75° position to the 265° position; a 10° section which has neither vacuum suction nor vent air from the 265° position to the 255° position; a 10° vent air section from the 255° position to the 245° position; and a 170° section which has neither vacuum suction nor vent air from the 245° position to the 75° position.

At the point of vacuum suction cut-off for alternating tube sections 214 and 210, at the 265° position, transfer drum 136 is adjacent first selection drum 138. Alternating tube sections 214 and 210 are transferred to first selection drum 138 during the next 10° when there is neither vacuum suction nor vent air supplied to flutes 135. In the following 10° on transfer drum 136, from the 255° position to the 245° position, vent air is supplied to flutes 135. This air will blow any remaining tubes from the flutes 135 to enable them to receive another tube in the next rotation.

At the point of vacuum suction cut-off for alternating tube sections 216 and 212, the 180° position, transfer drum 136 is also adjacent second selection drum 144. Transfer is effected to second selection drum 144 during the next 10° when there is neither vacuum suction nor vent air supplied to flutes 135. In the following 25°, from the 170° position to the 145° position vent air is supplied to flutes 135. This will relieve vacuum from flutes 135 to enable product to transfer from drum 134 to drum 136.

First selection drum 138 rotates clockwise. In the clockwise direction, first selection drum 138 has a 105° vacuum suction section for flutes 145 from the 75° position to the 210° position; a 10° section which has neither vacuum suction nor vent air from the 180° position to the 190° position; a 20° vent air section from the 190° position to the 210° position and a 225° section which has neither vacuum suction nor vent air from the 210° position to the 75° position.

Once the alternating tube sections 214 and 210 are transferred to first selection drum 138, they are moved past inspection station 152 which determines if there is a tube section between alternating tube sections 214 and 210. The inspection station is located at the 115° position. The inspection station 152 is preferably a conventional light beam type station that is commercially available from Banner under model number SM512LBFO.

If there is a tube section or other material disposed between alternating tube sections 214 and 210, the tube material comprising tube sections 214, 210 and the tube section between them is ejected from first selection drum 138 in the 20° section from the 115° position to the 135° position. The tubes are ejected by means of air provided to the flutes with tubes that failed the inspection. The ejected tubes are deposited into scrap chute 142.

At the point of vacuum suction cut-off, the 180° position, first selection drum 138 is adjacent product chute 140. Alternating tube sections 214 and 210 drop by force of gravity drop into product chute 140 in the next 10° when there is neither vacuum suction nor vent air supplied to flutes 145.

If the sections do not drop into the product chute, vent air provided for the next 20° from the 190° position to the 210° position, will blow any remaining tubes from flutes 145 to enable them to receive alternating sections in the next rotation. And, if the vent air does not blow the sections from the flutes, the product stripper associated with the end of the chute will remove the product.

Second selection drum 144 rotates clockwise. In the clockwise direction, second selection drum 144 has a 180° vacuum suction section for flutes 155; a 10° section which has neither vacuum suction nor vent air from the 180° position to the 190 position; a 20° vent air section from the 190° position to the 210° position; and a 150° section which has neither vacuum suction nor vent air from the 210° position to the 000° position.

Once the alternating tube sections 216 and 212 are transferred to second selection drum 144, they are moved past inspection station 150 which determines if there is a tube section between alternating tube sections 216 and 212. The inspection station is located at the 115° position. The inspection station is preferably a conventional light beam type station that is commercially available from Banner under model number SM512LBFO.

If there is a tube section or other material disposed between alternating sections 216 and 212, the tube material comprising tube section 216, 212 and the tube section between them is ejected from second selection drum 144 in a 25° section from the 115° position to the 140° position. The tubes are ejected by means of air provided to the flutes with tubes that failed the inspection. The ejected tubes are deposited into scrap chute 148.

At the point of vacuum suction cut-off at the 180° position, second selection drum 144 is adjacent product chute 146. Alternating tube sections 216 and 212 drop by force of gravity drop into product chute 146 in the next 10° when there is neither vacuum suction nor vent air supplied to flutes 155.

If the sections do not drop into this product chute, vent air provided for the next 20°, from the 190° position to the 210° position, will blow any remaining tubes from flutes 155 to enable them to receive alternating sections in the next rotation of second selection drum 144. And if this vent air does not blow the sections from the flutes, the product stripper associated with the end of the chute will remove the products.

The terms and expressions which are employed herein are used as terms of expression and not of limitation. And, there is no intention in the use of such terms and expressions of excluding the equivalents of the features shown, and described, or portions thereof, it being recognized that various modifications are possible in the scope of the present invention as claimed.

We claim:

1. An apparatus for cutting thin-walled tubes, comprising:

transporting means having a surface for transporting the tubes, the transporting means including means for lifting the tubes a predetermined distance away from the surface of the transporting means, rotating the lifted tubes at a predetermined speed, and returning the tubes to the surface;

cutting means for cutting the lifted tubes into multiple sections of predetermined length as the tubes rotate; and selection means for selecting from the transporting means alternating tube sections.

2. An apparatus for cutting thin-walled tubes, comprising:

transporting means having a surface for transporting the tubes, the transporting means including means for inspecting the shape of the tubes and means for lifting the tubes a predetermined distance away from the surface of the transporting means, rotating the lifted tubes at a predetermined speed, and returning the tubes to the surface;

cutting means for cutting the lifted tubes into multiple sections of predetermined length as the tubes rotate; and selection means for selecting from the transporting means alternating tube sections.

3. An apparatus for cutting thin-walled tubes, comprising:

transporting means having a surface for transporting the tubes, the transporting means including means for inspecting the shape of the tubes, means for flaring the ends of the tubes, and means for lifting the tubes a predetermined distance away from the surface of the transporting means, rotating the lifted tubes at a predetermined speed, and returning the tubes to the surface;

cutting means for cutting the lifted tubes into multiple sections of predetermined length as the tubes rotate; and selection means for selecting from the transporting means alternating tube sections.

4. An apparatus for cutting thin-walled tubes, comprising:

transporting means having a surface for transporting the tubes, the transporting means including means for inspecting the shape of the tubes, means for flaring the ends of the tubes, means for aligning the tubes, and means for lifting the tubes a predetermined distance away from the surface of the transporting means, rotating the lifted tubes at a predetermined speed, and returning the tubes to the surface;

cutting means for cutting the lifted tubes into multiple sections of predetermined length as the tubes rotate; and selection means for selecting from the transporting means alternating tube sections.

5. An apparatus for cutting thin-walled tubes, comprising:

transporting means having a surface for transporting the tubes, the transporting means including means for lifting the tubes a predetermined distance away from the surface of the transporting means, rotating the lifted tubes at a predetermined speed, and returning the tubes to the surface;

cutting means for cutting the lifted tubes into multiple sections of predetermined length as the tubes rotate;

first selection means for selecting from the transporting means a first alternating set of tube sections; and second selection means for selecting from the transporting means a second alternating set of tube sections.

6. An apparatus for cutting thin-walled tubes, comprising:

transporting means having a surface for transporting the tubes, the transporting means including means for inspecting the shape of the tubes and means for lifting the tubes a predetermined distance away from the surface of the transporting means, rotating the lifted tubes at a predetermined speed, and returning the tubes to the surface;

cutting means for cutting the lifted tubes into multiple sections of predetermined length as the tubes rotate;

first selection means for selecting from the transporting means a first alternating set of tube sections; and second selection means for selecting from the transporting means a second alternating set of tube sections.

7. An apparatus for cutting thin-walled tubes, comprising:

transporting means having a surface for transporting the tubes, the transporting means including means for inspecting the shape of the tubes, means for flaring the ends of the tubes, and means for lifting the tubes a predetermined distance away from the surface of the transporting means, rotating the lifted tubes at a predetermined speed, and returning the tubes to the surface;

cutting means, coordinated with the means for lifting and rotating the tubes, for cutting the lifted tubes into multiple sections of predetermined length as the tubes rotate;

first selection means for selecting from the transporting means a first alternating set of tube sections; and second selection means for selecting from the transporting means a second alternating set of tube sections.

8. An apparatus for cutting thin-walled tubes, comprising:

transporting means having a surface for transporting the tubes, the transporting means including means for inspecting the shape of the tubes, means for flaring the ends of the tubes, means for aligning the tubes, and means for lifting the tubes a predetermined distance away from the surface of the transporting means, rotating the lifted tubes at a predetermined speed, and returning the tubes to the surface;

cutting means for cutting the lifted tubes into multiple sections of predetermined length as the tubes rotate;

first selection means for selecting from the transporting means a first alternating set of tube sections; and second selection means for selecting from the transporting means a second alternating set of tube sections.

9. The apparatus as defined in claims 1, 2, 3, 4, 5, 6, 7, or 8, wherein the means for lifting, rotating and returning each of the tubes is a driven mandrel.

10. The apparatus as defined in claims 1, 2, 3, 4, 5, 6, 7, or 8, wherein the cutting means includes a plurality of blades that are aligned parallel to each other so that the blades simultaneously cut each tube moving past the cutting means.

11. The apparatus as defined in claims 1, 2, 3, 4, 5, 6, 7, or 8, wherein the cutting means includes a plurality of blades that are staggered so that the blades in succession cut each tube moving past the cutting means.

12. The apparatus as recited in claims 2, 3, 4, 6, 7, or 8, wherein the means for inspecting the shape of the tubes includes means to determine if the tubes are crushed.

13. The apparatus as recited in claims 1, 2, 3, or 4, wherein the selection means further includes a means to ensure that alternating sets of tube sections are selected.

14. The apparatus as recited in claim 13, wherein the means to ensure that alternating sets of tube sections are selected includes optical inspection means.

15. The apparatus as recited in claims 5, 6, 7, or 8, wherein the first selection means further includes a means to ensure that the first alternating set of tube sections are selected.

16. The apparatus as recited in claim 15, wherein the means to ensure that the first alternating set of tubes are selected includes optical inspection means.

17. The apparatus as recited in claims 5, 6, 7, or 8, wherein the second selection means further includes a means to ensure the second alternating set of tube sections are selected.

18. The apparatus as recited in claim 17, wherein the means to ensure that the second alternating set of tubes are selected includes optical inspection means.

19. An apparatus for cutting thin-walled tubes, comprising:

first transport means for transporting the tubes to a second transport means;

said second transport means transporting the tubes from the first to a third transport means, the second transport means having a first tube inspection means for inspecting tubes being transported by the second transport means;

said third transport means transporting the tubes from the second to a fourth transport means, the third transport means having flaring means for flaring the tubes being transported by the third transport means;

said fourth transport means transporting the tubes from the third to a fifth transport means, the fourth transport means having alignment means for aligning the tubes being transported by the fourth transport means;

said fifth transport means having a surface for transporting the tubes from the fourth to a sixth transport means, the fifth transport means having means for lifting the tubes a predetermined distance away from the surface of the fifth transport means, rotating the lifted tubes at a predetermined speed and returning the tubes to the surface of the fifth transport means, and cutting means for cutting the lifted tubes into sections of predetermined lengths as the tubes rotate;

said sixth transport means transporting the tube sections from the fifth to a seventh transport means;

said seventh transport means transporting the tube sections from the sixth to an eighth and a ninth transport means;

said eighth transport means selecting from the seventh transport means a first alternating set of tube sections, the eighth transport means having second tube inspection means for inspecting tubes being transported by the eighth transport means; and said ninth transport means selecting from the seventh transport means a second alternating set of tube sections, the ninth transport means having a third tube inspection means for inspecting tubes being transported by the ninth transport means.

20. The apparatus as recited in claim 19, wherein the first tube inspection means inspects the shape of the tubes to determine if the tubes are crushed.

21. The apparatus as defined in claim 19, wherein the means for lifting and rotating the tubes includes a driven mandrel.

22. The apparatus as recited in claim 21, wherein the driven mandrel rotates a tube at a speed equal to the speed at which the fifth transport means moves the tubes past the cutting means so that the tubes rotate a complete revolution while engaged by the cutting means.

23. The apparatus as defined in claim 19, wherein the cutting means includes a plurality of blades that are aligned parallel to each other so that the blades simultaneously cut each tube as the fifth transport means moves the tubes past the cutting means.

24. The apparatus as defined in claim 19, wherein the cutting means includes a plurality of blades that are staggered so that the blades in succession cut each tube as the fifth transport means moves the tubes past the cutting means.

25. The apparatus as recited in claim 19, wherein the second tube inspection means includes means to ensure that the first alternating set of tube sections are selected.

26. The apparatus as recited in claim 25, wherein the means to ensure that the first alternating set of tube sections are selected includes optical inspection means.

27. The apparatus as recited in claim 19, wherein the second tube inspection means includes means to ensure that the second alternating set of tube sections are selected.

28. The apparatus as recited in claim 27, wherein the means to ensure that the second alternating set of tube sections are selected includes optical inspection means.

* * * * *